United States Patent [19]

Ichikawa

[11] Patent Number: 5,561,701
[45] Date of Patent: Oct. 1, 1996

[54] RADIO PAGING SYSTEM HAVING A PLURALITY OF TRANSMITTER STATIONS

[75] Inventor: Yoshio Ichikawa, Tokyo, Japan

[73] Assignee: NEC Corporation, Tokyo, Japan

[21] Appl. No.: 2,896

[22] Filed: Jan. 11, 1993

[30] Foreign Application Priority Data

Jan. 10, 1992 [JP] Japan .................................. 4-002970
May 20, 1992 [JP] Japan .................................. 4-127016
Jul. 8, 1992 [JP] Japan .................................. 4-180204
Jul. 15, 1992 [JP] Japan .................................. 4-187753

[51] Int. Cl.$^6$ ................................................. H04M 11/00
[52] U.S. Cl. ........................... 379/57; 455/51.1; 455/51.2
[58] Field of Search ................................ 379/57, 58, 59; 455/33.1, 56.1, 12.1, 13.1, 13.2, 51.1, 51.2

[56] References Cited

U.S. PATENT DOCUMENTS

| 4,696,052 | 9/1987 | Breeden ................................ 455/51.2 |
| 4,850,032 | 7/1989 | Freeburg ............................ 455/56.1 X |
| 5,287,550 | 2/1994 | Fennell et al. ........................ 455/51.2 |

FOREIGN PATENT DOCUMENTS

| 9211707 | 7/1992 | WIPO . |
| 9213417 | 8/1992 | WIPO . |

*Primary Examiner*—Curtis Kuntz
*Assistant Examiner*—G. J. Oehling
*Attorney, Agent, or Firm*—Sughrue, Mion, Zinn, Macpeak & Seas

[57] ABSTRACT

A global radio paging system in which a plurality of radio frequency carriers having the same frequency are synchronously modulated in a plurality of base stations corresponding in number to the radio frequency carriers with the same digital paging signal and transmitted, respectively. A paging controller which receives paging calls through a public switched telephone network stores preliminarily the maximum value of a sum of a paging request signal transmission time in a transmission line and a time required to process the paging request signal in each of the base stations and a high precision time signal is produced on the basis of a reference signal from a GPS (Global Positioning System) satellite. A transmission time assigning code is attached to the paging request signal, which assigns a time instance which is delayed from a current time determined by the high precision time signal by the maximum value of the sum of the transmission time and the processing tame as a transmission start time. In each of the base stations, a high precision time signal is produced on the basis of the reference time signal from the GPS satellite and the paging request signal supplied through the transmission line is processed on the basis of the high precision time signal to convert a format into the digital paging signal to thereby realize a synchronous modulation of the carriers.

2 Claims, 12 Drawing Sheets

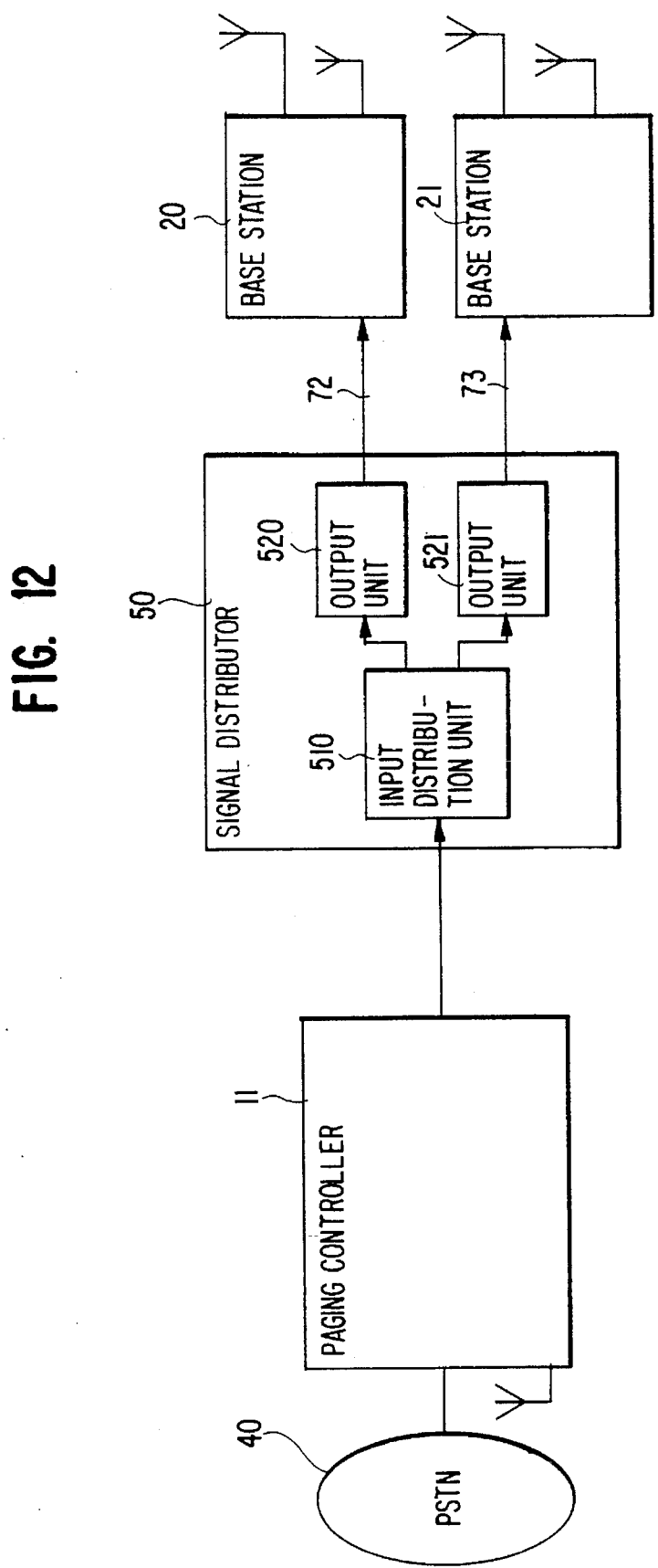

RADIO PAGING SYSTEM HAVING A PLURALITY OF TRANSMITTER STATIONS

BACKGROUND OF THE INVENTION

1. Field of the Invention

The present invention relates to a radio paging system and, particular, to a global radio paging system in which a plurality of radio frequency carriers having same frequency and modulated synchronously with same digital selective call signal, that is, paging signal, are transmitted from a plurality of mutually remote base stations, respectively.

2. Description of the Prior Art

In a radio paging system, in order to make a service area thereof wider, it is usual to arrange a plurality of base stations which are mutually separated by a predetermined distance and each of which has a radio transmitter whose output power is in the order of 100 W, and to simultaneously transmit a plurality of radio frequency carriers having same frequency and modulated with same digital paging signal therefrom. In such radio paging system, it is necessary to limit a phase difference between two received carriers in an area in which such radio frequency carriers from adjacent two base stations can be received, that is, an interference area, to a value not higher than a constant value which is usually within one fourth of a bit interval of the digital paging signal. For example, in a paging system which utilizes a digital paging signal of 512 BPS standardized by POCSAG (Post Office Code Standardization Advisory Group), that is, POCSAG code, the above mentioned phase difference must be not more than 488 μs. Therefore, it is necessary to make a phase error from a reference phase in each base station not more than about 250 μs.

On the other hand, a paging system of this kind is equipped with a central station between the base stations and a telephone switching network receiving paging requests. The central station includes a paging controller for performing a format conversion of paging request data from subscribers into a predetermined signal format, for example, a paging request signal format based on POCSAG code.

Interfaces between the central station and the base stations are formed by cables or radio frequency time-division multiplexors. In order to restrict the phase error within the predetermined range (about 250 μs) by compensating for a delay caused by signal transmission through the connection circuit between the central station and the base stations, the central station and the base stations include variable delay means respectively. On the other hand, U.S. Pat. No. 4,709,401 discloses an example of a paging system in which a central station transmits a radio frequency carrier signal modulated with a phase correction code having a predetermined code pattern to base stations and one of the base stations which receives the carrier signal and demodulates it to the phase correction code calculates and sets an amount of delay of its own variable delay means on the basis of the phase correction code.

In general, since the above mentioned connection circuit between the central station and one of the base stations is composed of a usual route and an extra route, it is necessary in the phase synchronous system of the U.S. patent to retry the calculation and setting of the amount of delay when the usual circuit is switched to the extra circuit due to failure in the usual circuit.

Further, when bit rate of the digital paging signal is further increased in order to satisfy recent request for effective utilization of radio frequency, the accuracy of phase correction according to the conventional technique mentioned above is not enough. That is, accuracy of phase correction required in a radio paging system corresponding to POCSAG code bit rate of which is 9600 BPS should be not more than 26 μs. This means that phase correction accuracy at a modulation input of a transmitter at which difference in delay between radio transmission areas and/or phase error in the transmitter is produced unavoidably must be within about 10 us which is practically impossible. Further, in the prior art mentioned above, a variation of delay in a transmission line connecting the central station to the base station must be made smaller than the above mentioned tolerable phase error. However, it is very difficult to achieve such accuracy in the time-division multiplexor circuit. An increase of signal delay in separating a time-division multiplexed signal in the above mentioned transmission line is always varied due to the fact that clock pulses of the paging controller and the time-division multiplexor are usually independent from each other. Therefore, if, in order to restrict a variation of delay, time-division multiplexing is restricted, the number of radio transmission lines is necessarily increased, causing cost for provision and maintenance of the transmission lines to be increased.

Further, an increase of the number of base stations in order to expand a service area requires an increase of the number of connection circuits between a central station and base stations, which increases cost for provision and maintenance of such circuits.

A multi-drop system in which a plurality of base stations are connected to a single line and a tree-connection system in which a signal distributor is arranged between a central station and base stations are effective in solving this problem. However, in the multi-drop system, a construction of transmission line is changed at a point on the line between the central station and the base station and, therefore, when an amount of delay is changed, a phase correction becomes very difficult. That is, although a variation of de ay occurred in a portion of the transmission line on the side of the central station does not arise any problem since phases of all of the base stations connected thereto change similarly, a variation of delay occurred on the side of base stations causes phase error between them. In the tree system, although it is possible to reduce a total length of transmission lines, a variation of de ay is increased correspondingly to the provision of the signal distributor. Therefore, when bit rate of a digital paging signal is increased, it is difficult to mantain phase synchronization between transmission outputs of a plurality of base stations. When a plurality of signal distributors are used, phase correction in base stations arranged in downstream side of the distributors becomes difficult.

BRIEF SUMMARY OF THE INVENTION

Object of the Invention

Therefore, an object of the present invention is to provide a radio paging system having connection lines for transmitting a digital paging signal to a plurality of base stations so that a plurality of radio frequency carriers having the same frequency and synchronously modulated with the same paging signal can be transmitted to the base stations, wherein accuracy of synchronization of the modulations of the radio frequency carriers with the digital paging signal can be maintained high regardless of variation of delay in the connection lines.

Another object of the present invention is to provide a radio paging system of the above mentioned type which can restrict an increase in number of the connection lines, compared with the increase in number of the base stations and the increase in number of the radio frequency carriers.

SUMMARY OF THE INVENTION

The present invention resides in a global paging system for providing a paging service for a plurality of paging receivers distributed in service areas of a plurality of base stations, which comprises a paging controller responsive to a paging call received from a subscriber of PSTN (Public Switched Telephone Network) through the PSTN for producing a paging request signal containing subscriber number of an owner of the paging receiver which is called and the plurality of base stations which are connected to the paging controller through a plurality of transmission lines having different transmission times and produce radio frequency carriers having the same frequency and modulated synchronously with a digital paging signal corresponding to the paging request signal, respectively, wherein the paging controller comprises a delay time storage memory circuit for preliminarily storing a first time value equal to the maximum value of the different transmission times of the transmission lines and a second time value required for producing the digital paging signal at each of the base stations from reception of the paging request signal, a first GPS (global positioning system) receiver responsive to signals received from a plurality of NAVSTAR GPS satellites for producing a time reference signal, a first time reference circuit responsive to the time reference signal for producing a high precision time signal having predetermined relation in time to the universal standard time and code producing means for producing a code indicative of a time after a time instance, which is obtained by adding a sum of the first time value and the second time to a current time indicated by the high precision time signal, to the paging request signal as a transmission start time assigning code and wherein each of the base stations comprises a receiving buffer memory means for receiving the paging request signal and storing it temporarily, a second GPS receiver responsive to the signals from the GPS satellites for producing the time reference signal, a second time reference circuit responsive to the time reference signal for producing a high precision time signal having a predetermined relation in time to the universal standard time, a coincidence circuit for detecting a coincidence between the transmission start time assigning code of the paging request signal accumulated in the receiving buffer memory means and the high precision time signal from the second time reference circuit, a format conversion circuit for format-converting the paging request signal into the digital paging signal from a time at which an coincidence output of the coincidence circuit is produced, in synchronism with the high precision time signal from the second time reference circuit and a radio transmitter for producing a radio frequency carrier having a predetermined frequency and modulated with the digital paging signal.

According to the radio paging system of the present invention, a transmission start time information is attached to a digital paging signal forming a modulation signal of a radio frequency carrier on one hand and, on the other hand, in each of the base stations, a plurality of radio frequency carriers having the same frequency are modulated by the paging signal synchronously at a time instance assigned by using the very high precision time information from the GPS satellite as a reference. Therefore, it is possible to prevent an interference between output signals from adjacent base stations when the modulated radio frequency carriers are received by the paging receivers.

BRIEF DESCRIPTION OF THE DRAWINGS

The above-mentioned and other objects, features and advantages of this invention will become more apparent by reference to the following detailed description of the invention taken in conjunction with the accompanying drawings, wherein:

FIG. 12 shows a system construction of a fourth embodiment of the present invention.

DETAILED DESCRIPTION OF THE PREFERRED EMBODIMENTS

Figure 1:
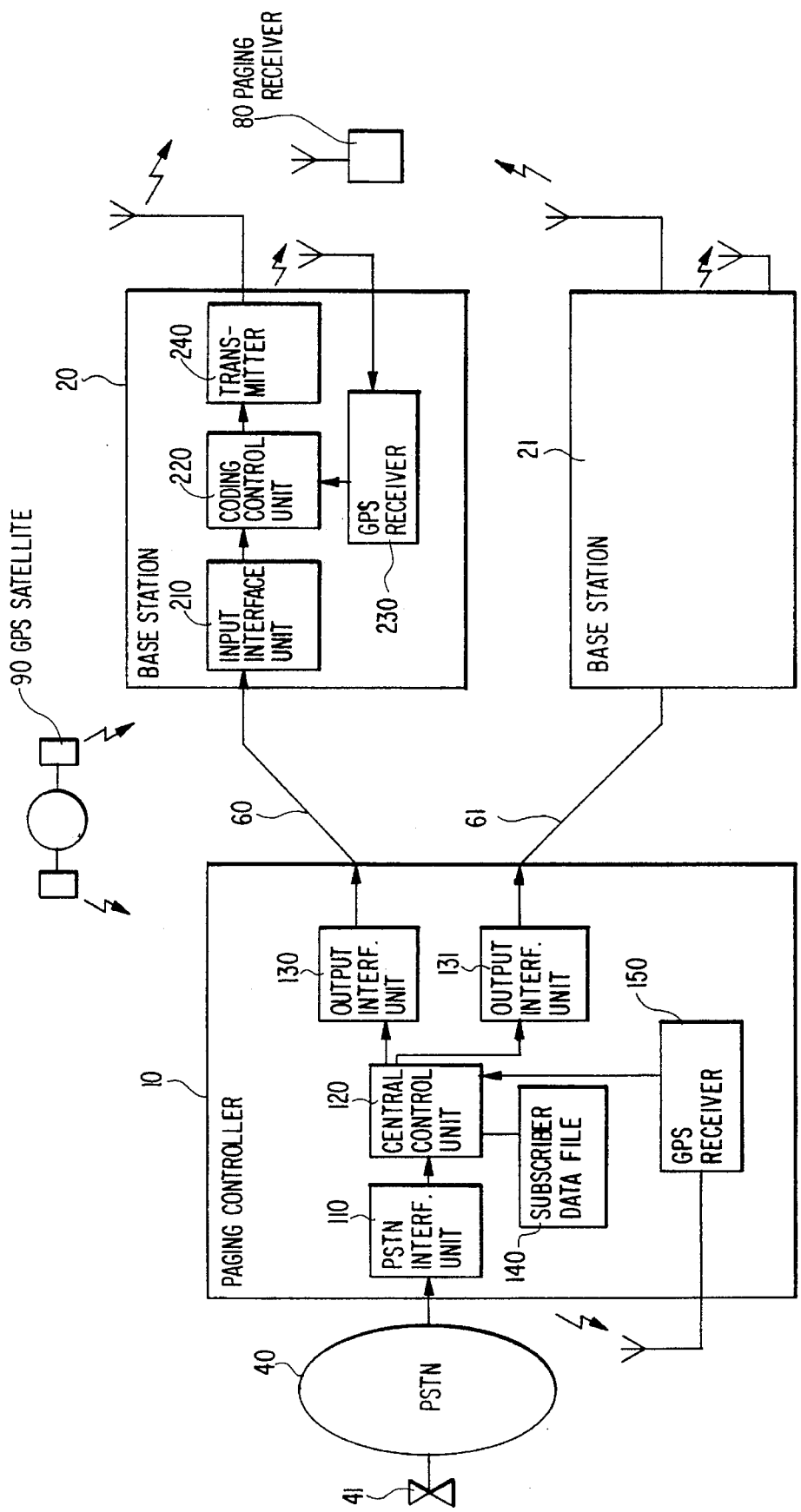
FIG. 1 is a block circuit diagram of a first embodiment of the present invention.

In FIG. 1 which shows a paging system according to a first embodiment of the present invention in block form, a paging controller 10 provided in a central station is connected to the Public Switched Telephone Network (PSTN) 40 and receives paging call signals from telephone terminals 41. The paging controller 10 includes a PSTN interface unit 110 for controlling a connection to the PSTN 40 and receiving a paging call reception signal produced by the PSTN 40 in response to the paging call signal, a central control unit 120 responsive to the paging call reception signal for producing a paging request signal attached with a transmission start time assigning code, output interface units 130 and 131 for supplying the paging request signal to transmission lines 60 and 61 connected to base stations 20 and 21, respectively, a subscriber data file 140 containing registration/non-registration information of numbers of subscribers of paging receivers 80 (only one is shown in FIG. 1 for simplicity of illustration) and a GPS receiver 150 for receiving signals from the NAVSTAR GPS (navigation satellite time and ranging global positioning system) satellite 90, producing clock pulse and time information very exactly synchronized with the universal standard time and supplying them to the central control unit 120. The base station 20 includes an input interface unit 210 for receiving the paging request signal through the transmission line 60, a GPS receiver 230 which operates similarly to the GPS receiver 150 for receiving signals from the GPS satellite 90 and producing clock pulse and time information very exactly synchronized with the universal standard time, a coding control unit 220 for format-converting the paging request signal attached with the transmission start time assigning code into a digital paging signal and a transmitter 240 for outputting a radio frequency carrier modulated with the digital paging signal, on the basis of the time information. The base Station 21 has an identical construction to that of the base station 20 and so details thereof are omitted in FIG. 1.

The GPS receivers 150 and 230 may have identical construction. It should be noted that means for producing clock pulse and time information synchronized with the universal standard time using the GPS receiver is well known and a method for calculating exact time at two mutually remote points based on the time imformation is disclosed in U.S. Pat. No. 5,134,407. An Original object of the GPS receiver is to detect position, that is, to know a position of the receiver on the basis of orbital information and time reference information from a plurality of GPS satellites. The respective GPS satellites are provided with atomic clocks using cesium and rubidium to which an information of time error with respect to the universal standard time is supplied from the ground. Therefore, the atomic clocks substantially coincide with the universal standard time. Thus, an error of time information obtained by each of the GPS receivers 150 and 230 with respect to the universal standard time is within 5 μs, indicating very high accuracy of the time information.

Figure 2:
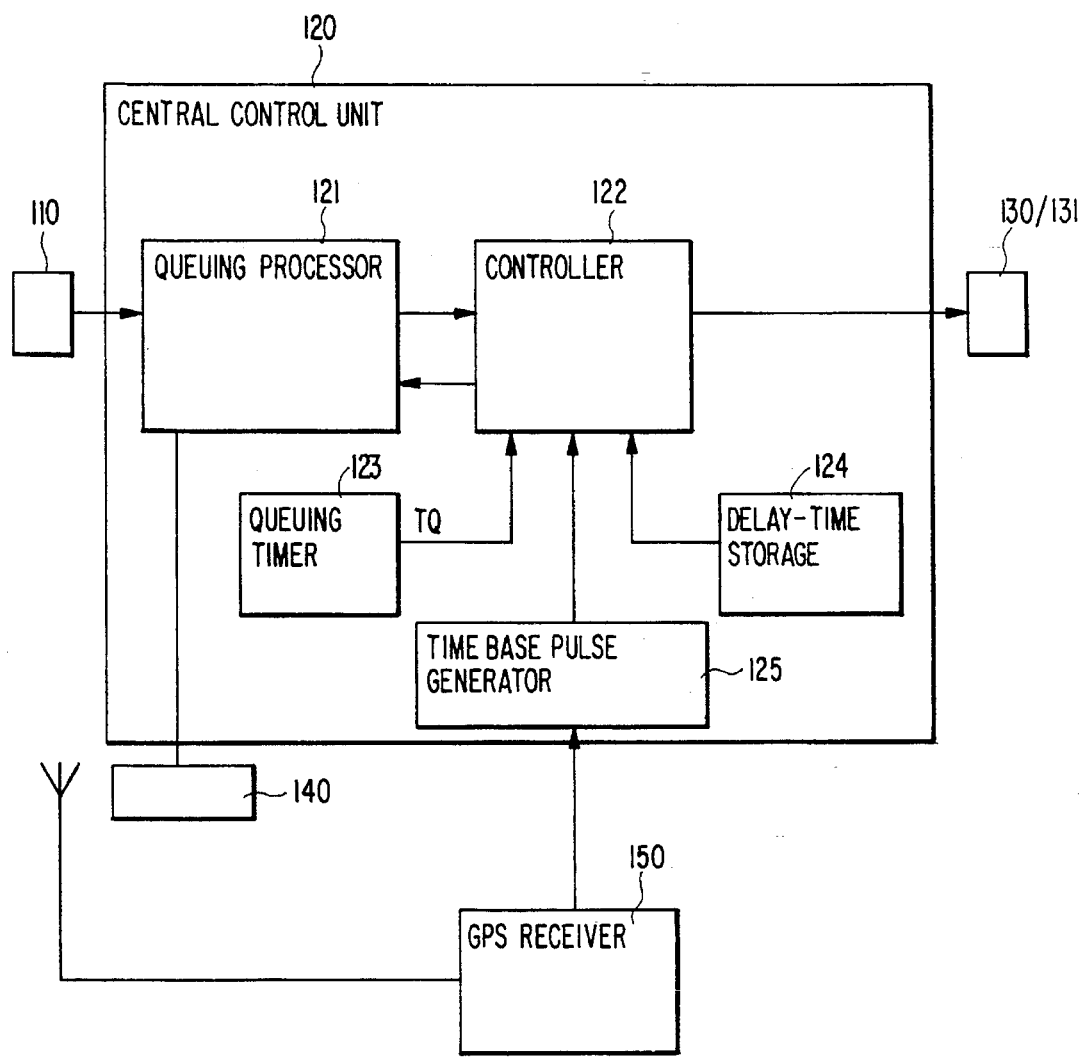
FIG. 2 is a detailed block circuit diagram of a central control portion of the embodiment shown in FIG. 1.

FIG. 2 shows the central control unit 120 in more detail. In FIG. 2, the central control unit 120 includes a queuing processor 121 for temporarily storing the paging call reception signal from the PSTN interface unit 110 and queuing it, a queuing timer 123 for producing a timing signal TQ having a predetermined interval indicative of an arrangement of the call reception signals on a time axis, a delay time storage 124 for storing values of the maximum delay time among delay times of the transmission lines 60 and 61 and processing times in the base stations 20 and 21, a reference time pulse generator circuit 125 for generating clock pulse and time information synchronized with the universal standard time on the basis of an output of the GPS receiver 150 and a control circuit 122 for controlling the above mentioned circuits to convert the format of the call reception signals in the queuing processor 121 into a set of paging request signals every reception of the timing signal TQ, to calculate a transmission start time on the basis of a current time indicated by an output of the reference time pulse generator circuit 125 and delay time indicated by an output of the delay time storage 124, attach a code corresponding to the calculated time to the paging request signal and supply it to the base stations 20 and 21 through the output interface units 130 and 131, respectively.

Figure 3:
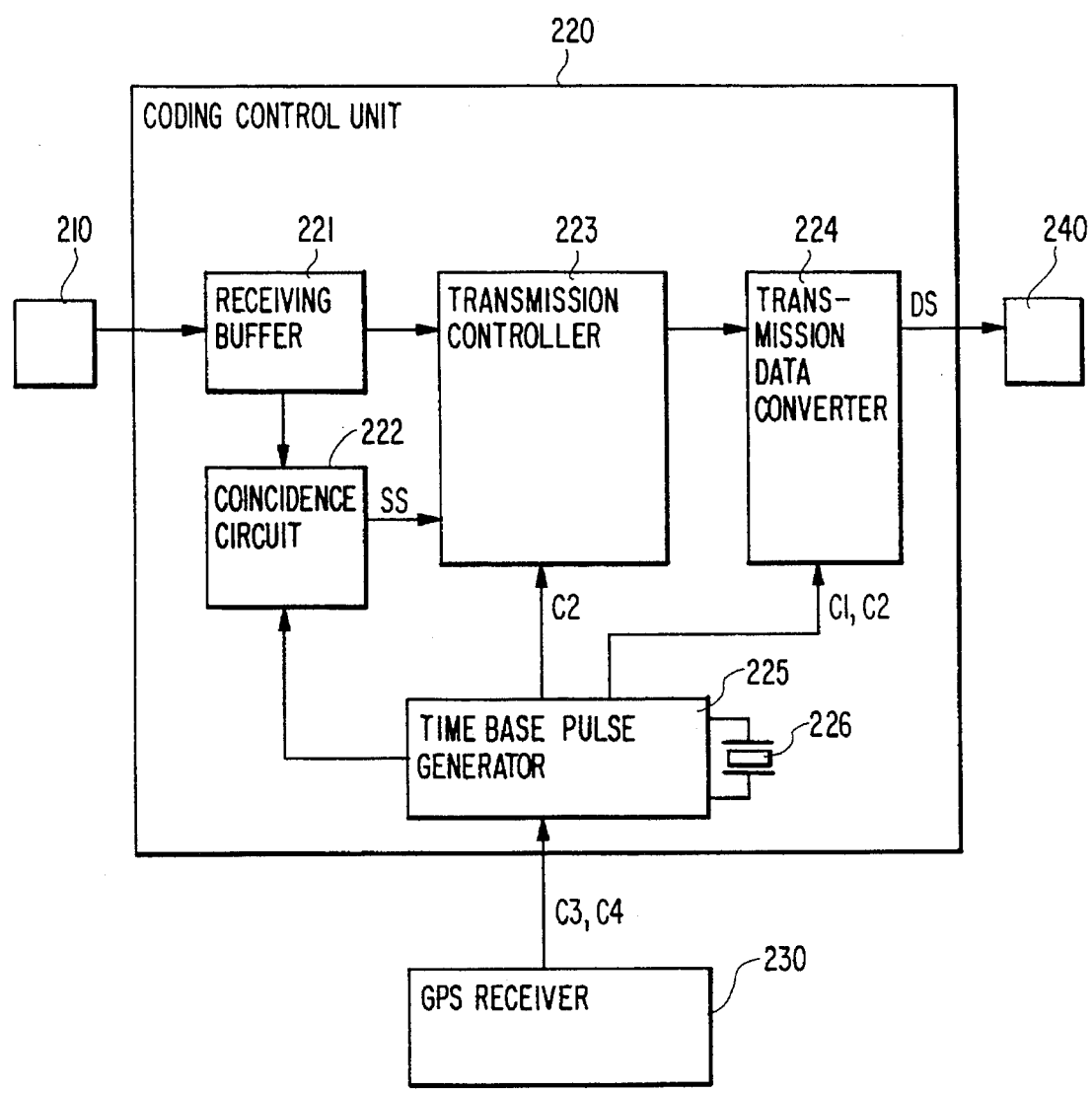
FIG. 3 is a detailed block circuit diagram of a coding control portion of the embodiment shown in FIG. 1.

FIG. 3 shows the coding control unit 220 in more detail. In FIG. 3, the coding control unit 220 includes a receiving buffer 221 for receiving the paging request signal attached with the transmission start time assigning code from the input interface unit 210 and temporarily storing it, a reference time pulse generator circuit 225 for producing clock pulse and time information synchronized with the universal standard time on the basis of the output of the GPS receiver 230, a coincidence circuit 222 for detecting a coincidence between a current time indicated by the reference time pulse and the assigning time of the paging request signal in the receiving buffer 221 and outputting a sending signal SS, a transmission data converter 224 for format-converting the paging signal into a digital paging signal and supplying the latter to the transmitter 240 as a modulation signal and a transmission control circuit 223 for controlling a selective supply of the paging request signal in the receiving buffer 221 and the format conversion on the basis of the sending signal SS.

An operation of the embodiment mentioned above will be described with reference to a case where the digital paging signal is a POCSAG code of 512 BPS.

Referring to FIGS. 1 and 2, the paging controller 10 always checks, in its PSTN interface unit 110, whether or not there is a call of paging request from any telephone terminal 41 (S1). When there is a call, it enters into an operation for receiving a subscriber number called (S2). It is general in Japan that the number of the subscriber called is constituted with an MF (Multi Frequency) signal when the connection to the PSTN 40 is a trunk connection. After reception of the called subscriber number, the queuing processor 121 references with the subscriber data file 140 (S3) and the paging request is received only if the called subscriber number is registered therein. When the called subscriber is one of members to whom paging service with message service is to be directed (S4), a message in the form of PB (Push Button) signal is received (S5). In this manner, a plurality of paging call reception signals received successively are accumulated in the queuing processor 121 till the timing signal TQ from the queuing timer 123. Then, the queuing processor 121 produces a series of paging signals whose format is very close to the POCSAG code (S6). (This processing is called as queuing.)

The control circuit 122 converts the format of the paging reception signals accumulated in the queuing processor 121 into the paging request signal format every reception of the timing signal TQ having the predetermined time interval, adds a data transmission time indicated by the output of the delay time storage 124 and the receiving and processing time on the side of the base station to the current time indicated by the output of the reference time pulse generator circuit 125, attaches to the paging request signal a time lapsed after the time indicated by a result of the addition as a transmission start time and sends it to the base stations 20/21 through the output interface units 130/131 and the transmission lines 60/61.

Figure 5:
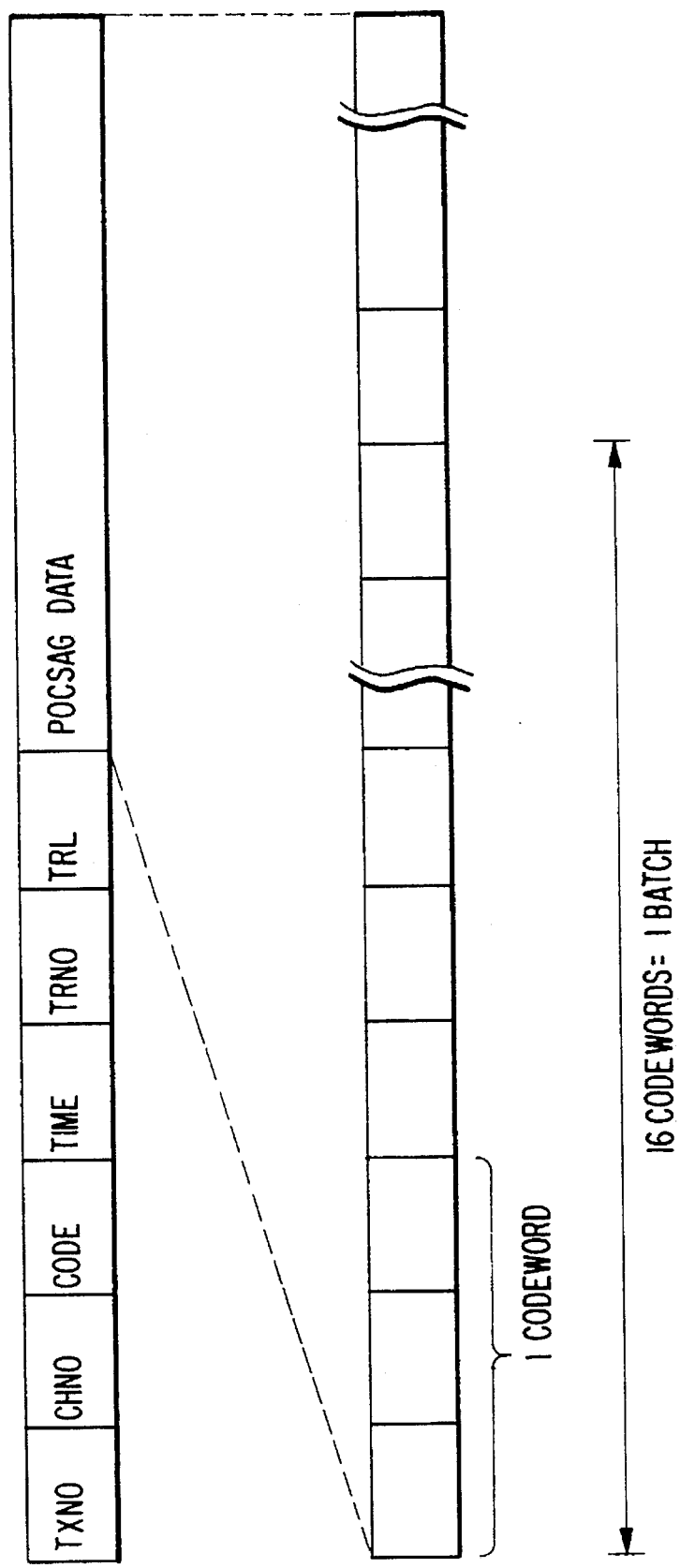
FIG. 5 is a timing chart showing a format of a paging request signal in the embodiment shown in FIG. 1.

A transmission protocol of the paging request signal uses HDLC (High Level Data Link Control) as the second layer of OSI and a format shown in FIG. 5 as the seventh layer of OSI. In FIG. 5, "TXNO" depicts an identification (ID) number of a destinated base station, "CHNO" a channel number indicative of a radio frequency channel through which a transmission data is to be sent, "CODE" an assignment of format of transmission data to be sent (e.g., for POCSAG512BPS, "01"), "TIME" an assignment of transmission start time for transmission data (e.g., for a case of transmission at 12 O'clock 10 minute 00 Second, "1000"), "TRNO" a transaction number indicating an ID number of this packet and "TPL" a transaction packet length indicating a data length of this packet. Further, as to "POCSAG data", only 21 information bits are transmitted as 1 codeword of three bytes and a parity bit and a preamble and a synchronization codeword (SC) are attached on the side of the base station. With this scheme, the transmission time through the transmission line is shortened. As is clear from the foregoings, the system according to the present invention is featured by inserting the transmission start time information to an upstream of respective paging request signal.

The numbering system of the ID numbers of the respective base stations is selected so as to allow not only individual base stations but also all base stations in a group or all groups to be assigned simultaneously. The central control unit 120 selects an ID number correspondingly to a transmission line and a state of a base station and sets "TXNO". "CHNO" is used when a base station has a plurality of radio frequency channels.

Figure 6:
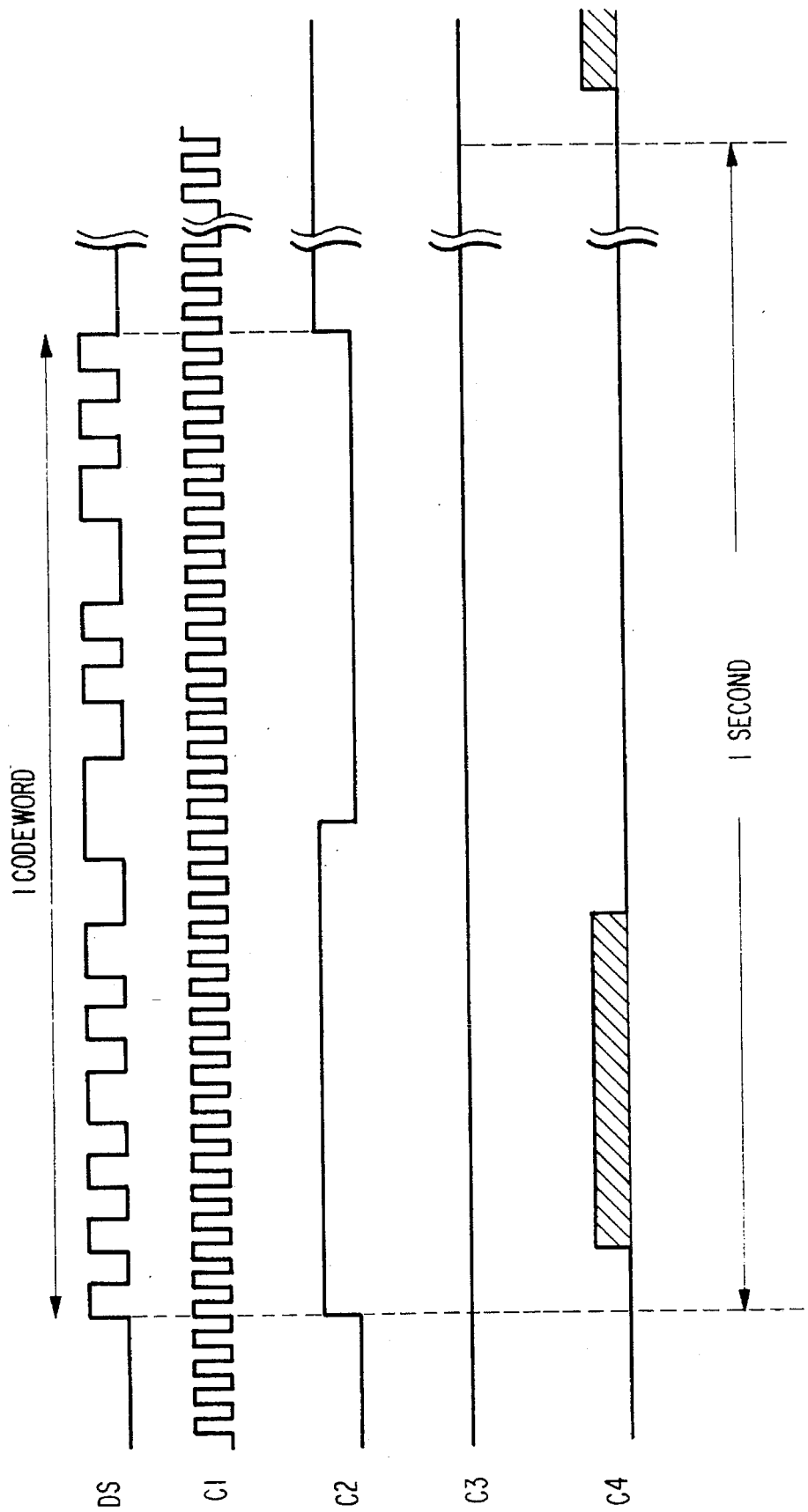
FIG. 6 is a timing chart showing a relation in time position of signals in the coding control portion shown in FIG. 3.

Referring to FIG. 6 together with FIGS. 1 and 3, the base station 20 receives, as "TXNO", a paging request signal to itself or all base stations and the coding control unit 220 stores this paging request signal in the receiving buffer 221 which is sectioned by addresses. The GPS receiver 230 supplies to the reference time pulse generator circuit 225 a pulse signal C3 having repetition period of 1 second and a time signal C4 in the form of series data slightly delayed with respect to the signal C3. The reference time pulse generator circuit 225 is equipped with a highly stable quartz oscillator 226 to know a more exact time based on the signals C3/C4 from the GPS receiver 230. Since the time signal C4 is supplied to the reference time pulse generator circuit 225 slightly after the pulse signal C3, it is possible to synchronize it with the universal standard time by using a time indicated by the signal C4 previously received added by 1 second as a time at which the pulse signal C3 is received. The reference time pulse generator circuit 225 supplies to the transmission data converter 224 a clock pulse C1 for every bit and a clock pulse C2 for every codeword to synchronize the digital paging signal format, that is, the transmission format data DS every bit and every codeword. Time information of the reference time pulse generator circuit 225 is also supplied to the coincidence circuit 222 which reads out a transmission start assigning time in "TIME" region of the paging request signal from the receiving buffer 221 every reception of the pulse signal C3, references it with a current time indicating pulse from the reference time pulse generator circuit 225 and outputs the sending signal SS together with the storing address of the data to the transmission controller 223 when these times are coincident. The transmission controller 223 supplies data in the "POCSAG data" region corresponding to the above address to the transmission data converter 224 successively. The transmission data converter 224 is operated in synchronism with the clock pulses C1 and C2 to attach a parity bit tp to an input digital signal, convert it into a transmission format data DS by further adding a preamble and SC thereto and supply it to the transmitter 240 as a modulation signal. The transmitter 240 modulates a radio frequency carrier with the digital paging signal from the transmission data converter 224 and transmits it as an electromagnetic wave so that the digital paging signal calls a specific paging receiver 80. Since the base station 21 operates in synchronism with the universal standard time as does the base station 20, it is possible to restrict a phase difference between the digital paging signals forming the modulation signals from the base stations within ¼ bit length.

As mentioned above, in the system according to the present invention in which the GPS receivers of respective base stations generate references for phase comparison, synchronization of the modulation signals between these base stations can be maintained without influence of different delay times of the transmission lines between the paging controller (central station) and the respective base stations.

Figure 7:
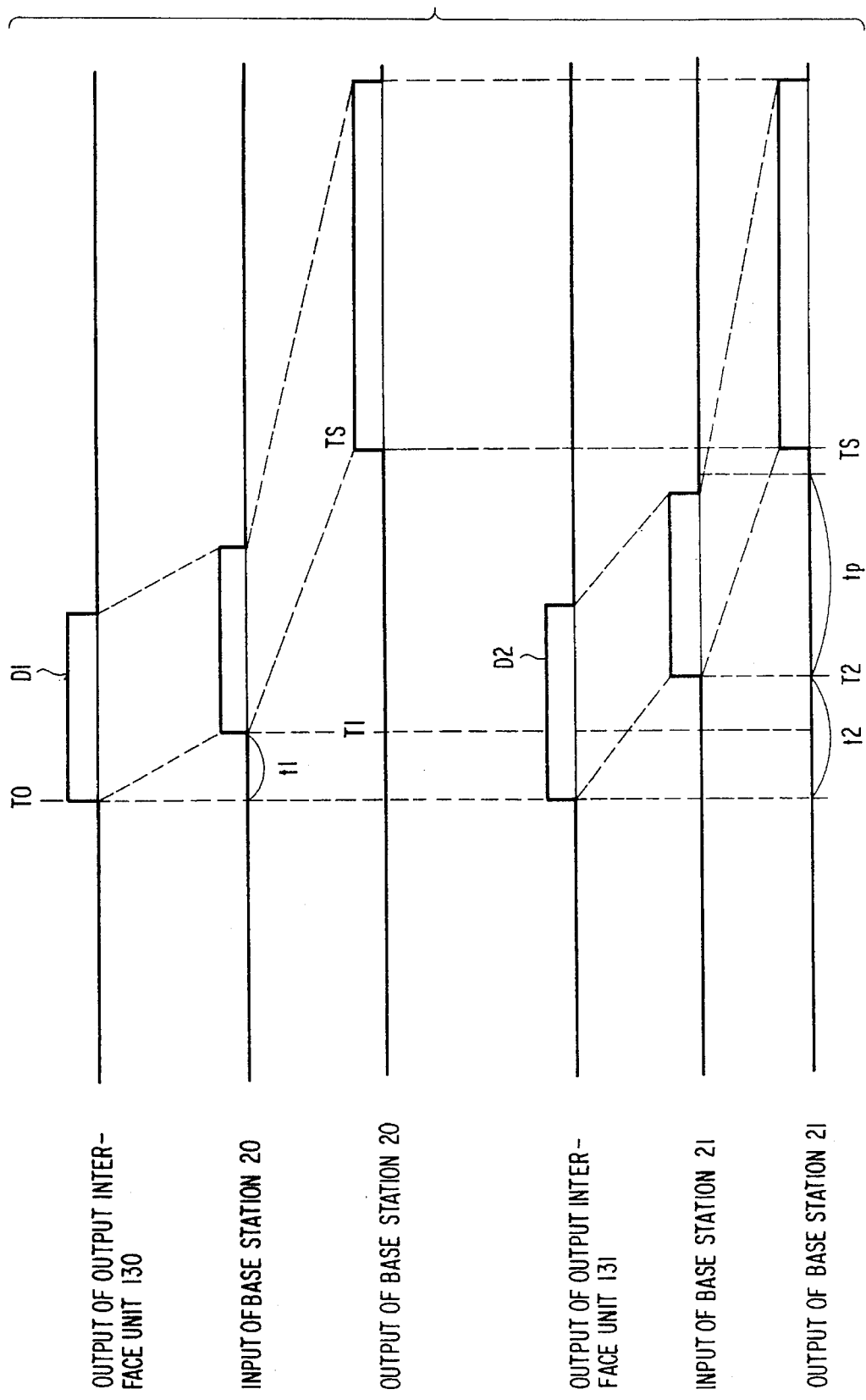
FIG. 7 is a timing chart showing a relation in time position of modulation signals in the embodiment shown in FIG. 1.

Referring to a timing chart shown in FIG. 7, at a time instance T0, a paging request signal assigning a transmission start time TS is output through the output interface units 130 and 131 of the paging controller 10 of the central station.

The paging request signal D1 output to the transmission line 60 is received and temporarily stored in the base station 20 at a time instance T1 after a transmission delay time t1. The paging request signal D2 output to the transmission line 61 is received and temporarily stored in the base station 21 at a time instance T2 after a transmission delay time t2. At a time instance TS, the base stations 20 and 21 form digital paging signals by the signal format conversions, respectively, and start transmission of radio frequency carriers modulated with thus formed signals, respectively. The paging controller 10 instructs the transmission start time TS by adding, to the current time (T0 in FIG. 7), the maximum transmission delay time (t2 in FIG. 7) and the data receiving and processing time (tp in FIG. 7) in the base station. When the present invention is applied to a system in which a calling subscriber assigns a transmission time at a time of calling (refer to Japanese Kokai 59-85147), a paging request signal should be output from the paging controller before the assigned time TS by a sum of t2 and tp.

Figure 8:
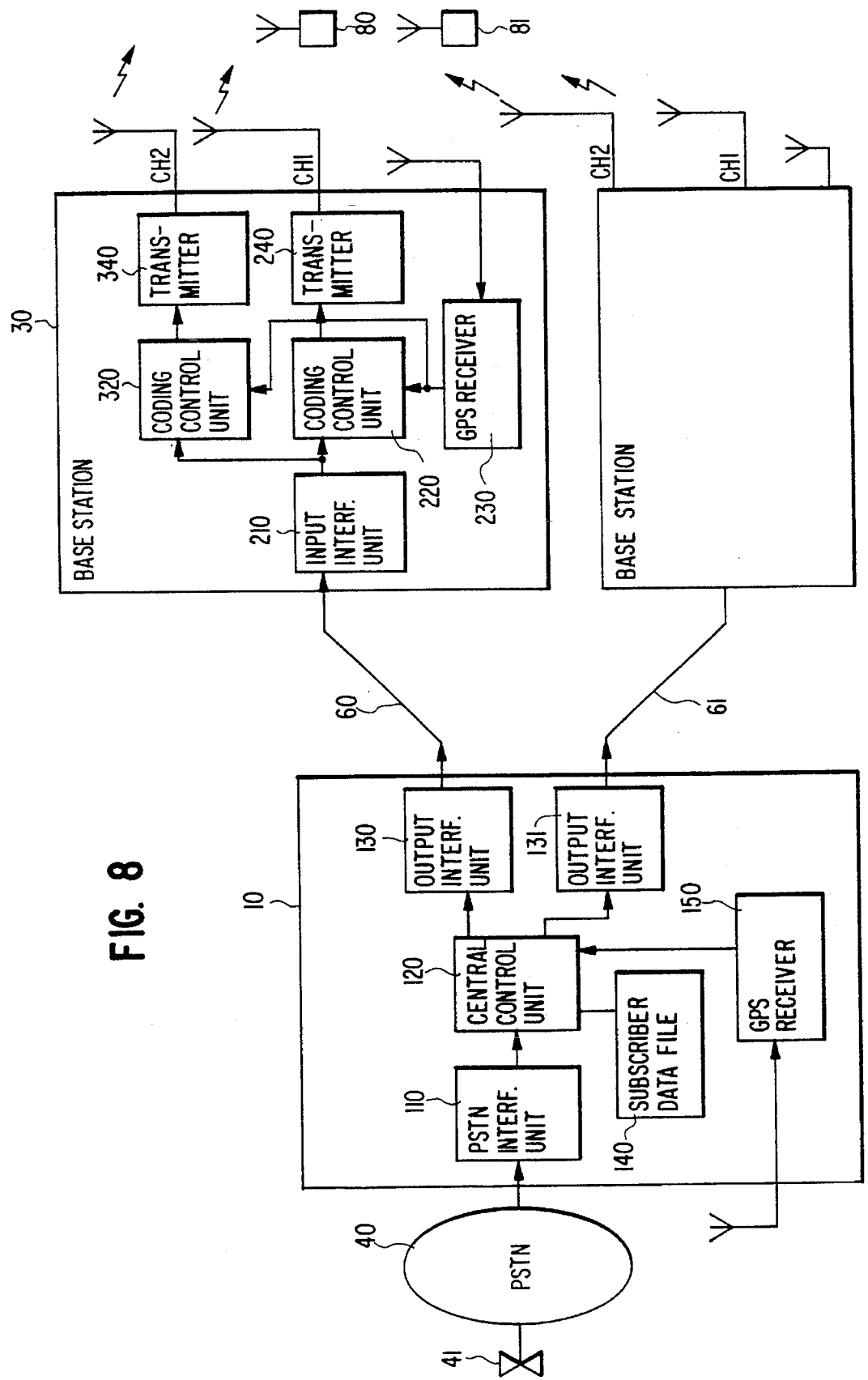
FIG. 8 is a block circuit diagram of a second embodiment of the present invention in which respective base stations transmit two mutually different nonmodulated radio frequency carriers.

FIG. 8 is a block circuit diagram showing a second embodiment of the present invention in which two radio frequency carriers having different frequencies are transmitted. The second embodiment shown in FIG. 8 has a construction in which the base stations 20 and 21 in the embodiment shogun in FIG. 1 are replaced by base stations 30 and 31 having the above mentioned different radio frequency carriers, respectively. In FIG. 8, the base station 30 has coding control units 220 and 320 and transmitters 240 and 340 correspondingly to radio channels CH1 and CH2 for the two radio frequency carriers. These constitutional components are identical in construction and function to the coding controller 220 and the transmitter 240 of the first embodiment shown in FIG. 1, respectively. Similarly, components depicted by the same reference numerals as those in FIG. 1 are identical in construction and function to those in FIG. 1, respectively.

Figure 4:
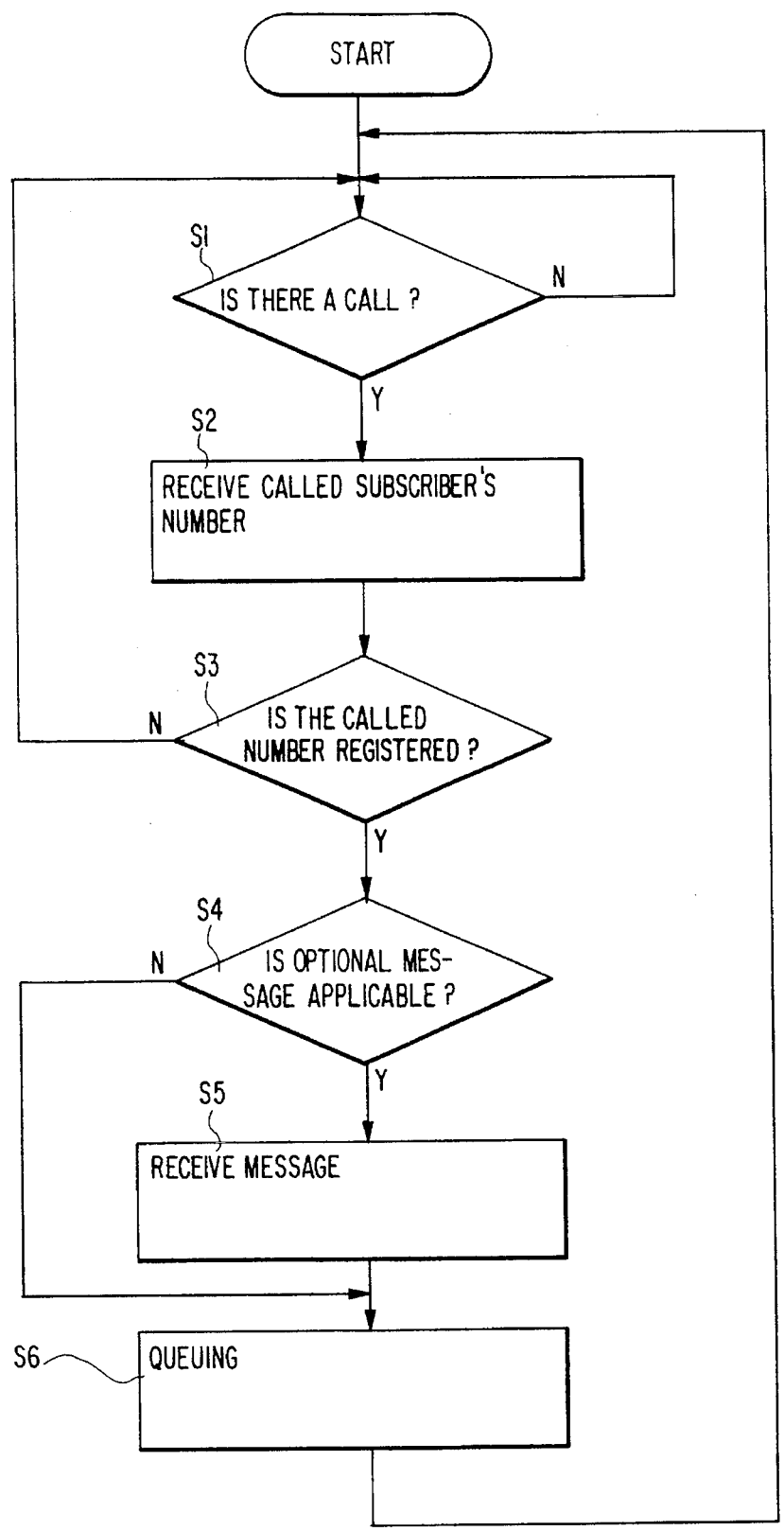
FIG. 4 is a flow-chart showing an operation of a paging controller of the embodiment shown FIG. 1.

An operation of this embodiment will be described. A central control unit 120 performs a queuing processing according to the flowchart shown in FIG. 4 when the central control unit receives a paging call from a telephone terminal 41 in the PSTN 40. On the other hand, each of a plurality of paging receivers 80 and 81 (only two of them are shown) is tuned to either the radio channel CH1 or CH2 and an information of this transmission channel number is stored in a subscriber data file 140 correspondingly to a subscriber number. When the central control unit 120 performs the queuing processing, it references the subscriber data file 140 to confirm a registration of the number of a subscriber called and classify it every assigned radio channel and performs the queuing processing. The central control unit 120 responds to a timing signal TQ to sequentially forming paging request signals (FIG. 5) for each radio channel and transmits them to the base stations 30/31 through transmission lines 60/61. In each of the base stations 30/31, a radio channel number in "CHNO" region of the paging request signal received by an input interface unit 210 is identified and it is sent to the coding control unit 220 when it is radio channel CH1 or to the coding control unit 320 when it is the channel CH2. The coding control unit 220 and the transmitter 240 which correspond to the radio channel CH1 operate independently from the coding control unit 320 and the transmitter 340 which correspond to the radio channel CH2 and can call the paging receivers 80/81 separately at an assigned time. Means for accurately calculating a current time based on signals from GPS receivers 150/230 in the paging controller 10 and the base stations 30/31 is the same as that of the embodiment shown in FIG. 1.

Figure 9:
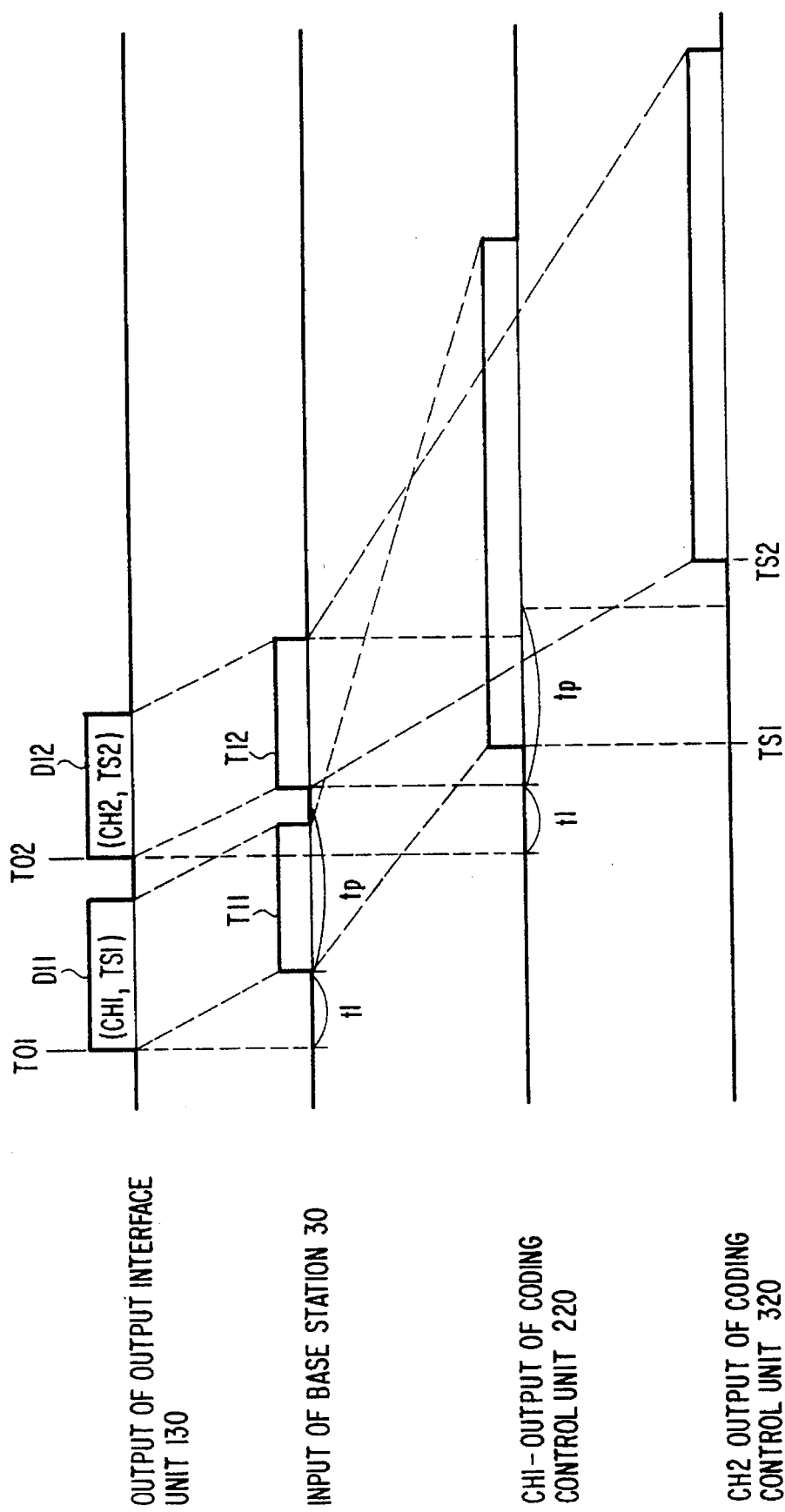
FIG. 9 is a timing chart showing a relation in time position of the modulation signals in the second embodiment shown in FIG. 8.

FIG. 9 shows a relation in time position between inputs and outputs of respective portions of the paging request signal and the digital paging signal in this embodiment. In FIG. 9, from an output interface unit 130, a paging request signal D11 which assigns a transmission time TS1 for the radio channel CH1 and a paging signal D12 which assigns a transmission time TS2 for the radio channel CH2 are continuously sent to the same transmission line 60 from time instances T01 and T02, respectively, and are received by the base station 30 at times instances T11 and T12 after delay of t1, respectively. The coding control unit 220 of the base station 30 converts the format of the signal D11 at the time TS1 to form a digital paging signal for the channel CH1. Even if the signal on the radio channel CH1 continues, the coding control unit 320 converts the format of the signal D12 to form a digital paging signal for the radio channel CH2. The signals D11/D12 are also supplied to the transmission line 61 from the output interface unit 131 of the paging controller 10 at time instances T01/T02 and received by the base station 31 after a delay which is different from t1. The transmission start time of the paging signals of the radio channel CH1 and CH2 are, of course, synchronized with those of the base station 30, respectively.

As described, even when paging signals from a plurality of radio channels are overlapped in time, it is possible to transmit these paging signals on a single transmission line in time sharing manner since the transmission start time assigning codes are attached to the paging request signals to be transmitted through transmission lines between the paging controller 10 and the respective base stations 30/31, so that there is no need of increasing the transmission lines. Of course, the bit rate of the paging request signal on a transmission line should be N (the number of radio channels) times that of the transmission format. However, it is possible to increase the time sharing multiplexing rate, correspondingly. For example, for the case of 512 BPS POCSAG code, it is possible to multiplexing at least 10 channels if the bit rate of the paging request signal on the transmission line is 9600 BPS.

Figure 10:
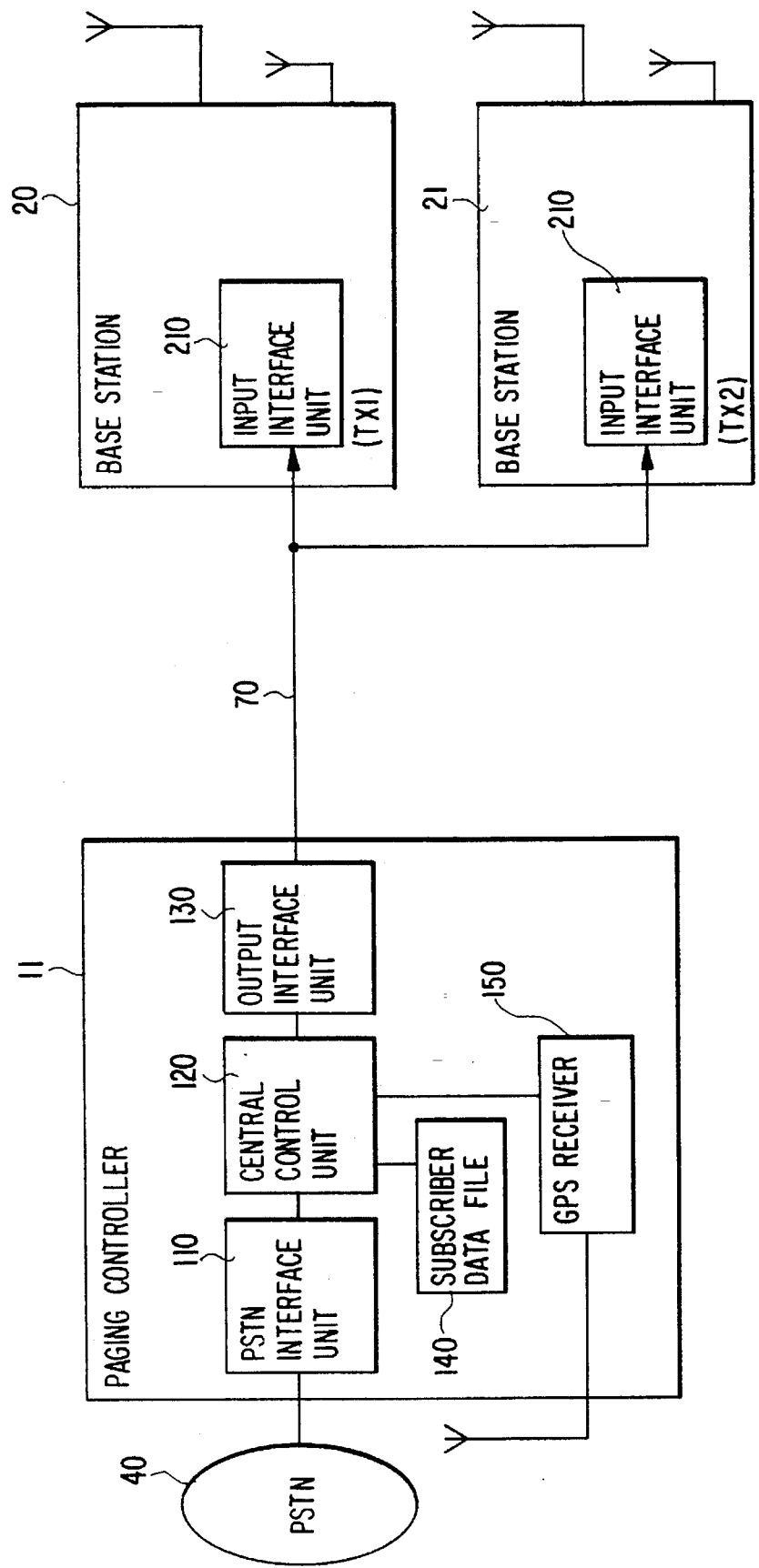
FIG. 10 is a block circuit diagram of a third embodiment of the present invention.
Figure 11:
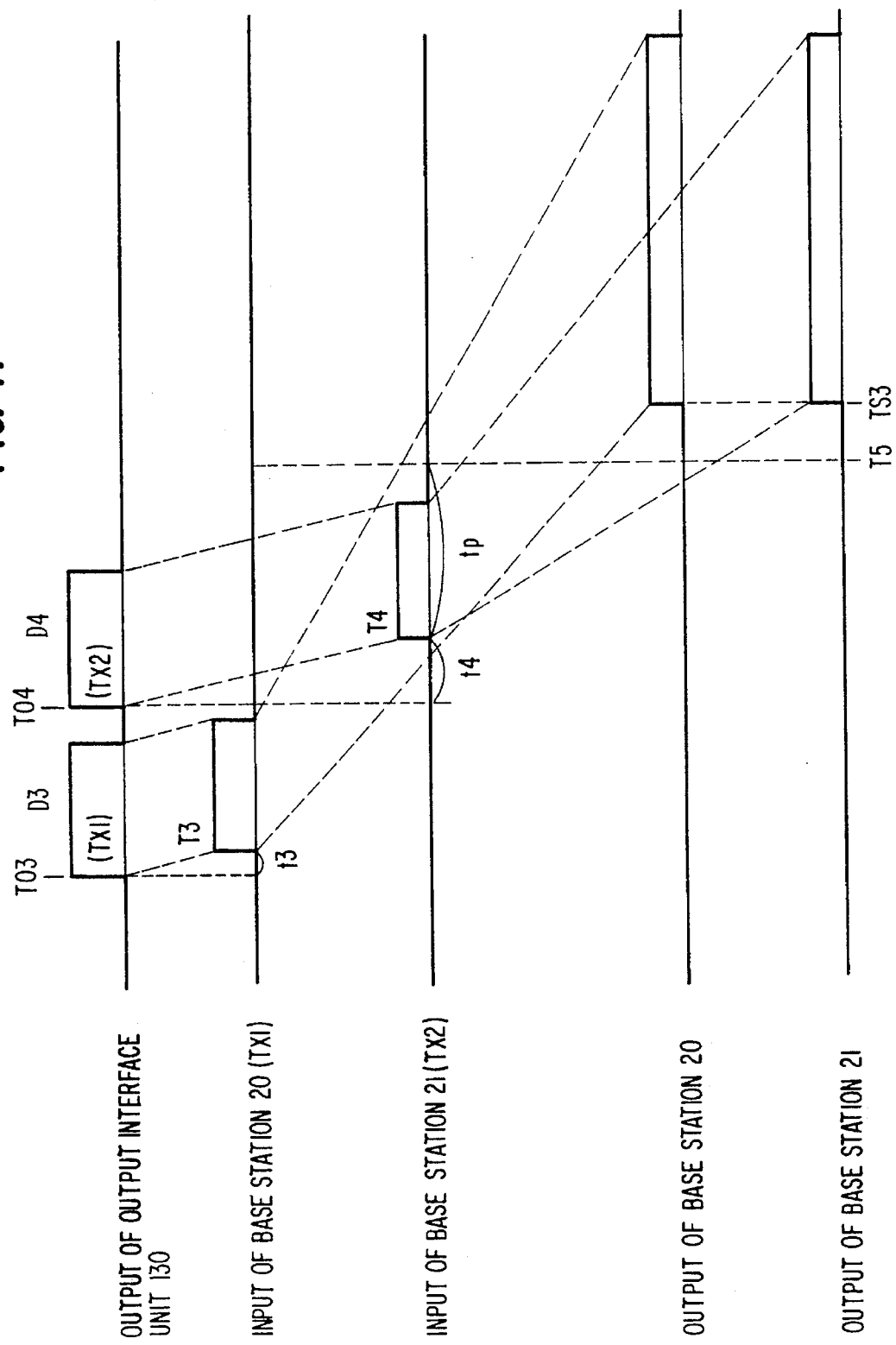
FIG. 11 is a timing chart showing a relation in time position of the modulation signals in the third embodiment shown in FIG. 10.

FIG. 10 shows a third embodiment of the present invention which is similar to the respective embodiments except that transmission lines between a paging controller 11 and base stations 20/21 are modified. In FIG. 10, a transmission line 70 connects in multi-drop manner between an output interface unit 130 of the paging controller 11 and respective input interface units 210 of a plurality of base stations 20/21. As a paging request signal sent from the paging controller 11 to the transmission line 70, "TXNO" may be assigned for all of the base stations. In such case, however, it may be difficult to confirm on the side of the paging controller 11 whether or not the respective base stations receive the signal normally. This is because acknowledge signals (ACK) indicative of normal reception of paging request signal from the respective base stations 20/21 collide each other. In order to solve this problem, paging request signals are transmitted to the base stations 20/21, respectively, as shown in FIG. 11. The paging controller 11 transmits a paging request signal D3 assigning an ID number (TX1) designated to the base station 20 to "TXNO" region at a time T03 and thereafter transmits a paging request signal D4 assigning an ID number (TX2) to the base station 21 at a time T04. The signals D3 and D4 are received by the base stations 20/21 at times T3 and T4 after transmission delay times t3 and t4, respectively. Therefore, the respective base stations 20/21 can return ACKs at different timings respectively. It is of course necessary to set the transmission start time TS3 after a time T5 at which all of the base stations complete reception of the paging request signals. In this system, the bit rate of the paging request signal to be transmitted through the transmission line 70 must be M times that of one base station where the number of base stations to be connected is M (in FIG. 10, M =2). However, it is possible to increase the time sharing multiplexing rate, correspondingly. For example, in a case of 512 BPS POCSAG code, it is possible to connect at least 10 base stations to a single transmission line when the bit rate of the paging request signal on the transmission line is 9600 BPS.

FIG. 12 shows a fourth embodiment of the present invention, which has a tree connection structure in which a signal distributor 50 for relaying/distributing paging signals is provided in a transmission line so as to accommodate to an increase of distance between a paging controller 11 and respective base stations 20/21. In FIG. 12, the signal distributor 50 includes an input distribution unit 510 connected to a transmission line 70 from the paging controller 11 for receiving and distributing a paging request signal and output units 520 and 521 for outputting respective paging request signals distributed by the input distribution unit 510 to the base stations 20 and 21 through transmission lines 72 and 73, respectively. In this embodiment, it is possible to reduce the number of transmission lines from the paging controller, compared with the number of the base stations, as in the embodiment shown in FIG. 10.

As described hereinbefore, the radio paging system according to the present invention can prevent an interference between output signals from adjacent base stations when the modulated radio frequency carriers are received by the paging receivers since a transmission start time information is attached to a digital paging signal forming a modulation signal of a radio frequency carrier on one hand and, on the other hand, in each of the base stations, a plurality of radio frequency carriers having the same frequency are modulated by the paging signal synchronously at a time instance assigned by using the very high precision time information from the GPS satellite as a time reference. Further, since the paging signal transmission line between the paging controller and the respective base stations can be implemented as the multidrop connection, the tree connection or the star connection or any combination thereof, phase synchronization for achieving simultaneous transmission from a plurality of base stations becomes possible and so the number of transmission lines and hence the cost therefor can be saved correspondingly.

It should be noted in FIG. 3 that, when it becomes impossible to obtain the clock pulse and time information from the GPS receiver 230, the reference time pulse generator circuits 225 of the respective base stations run by the highly stable quartz oscillator 226. A quartz oscillator whose stability is 0.01 PPM or less is practically usable as the oscillator 226 for bit rate of 9600 BPS. When bit rate of the paging signal is lower than 9600 BPS, the stability of the quartz oscillator may be lesser. Alternatively to the use of such self-running quartz oscillator, it is possible to provide back-up means for producing a clock pulse synchronized in phase with the clock of the GPS receiver by using a synchronizing clock pulse of the transmission line, a synchronizing signal of a television broadcasting wave or a standard wave such as JJY. In this case, after synchronized in the GPS receiver, the synchronization is maintained by the back-up means. The same is true for the reference time pulse generator circuit 125 of the paging controller in FIG. 2. That is, the stability of the circuit 125 may be lower compared with the base station side. Therefore, a reference time pulse generator circuit using such back-up means can be employed without using the GPS receiver 150.

Although the present invention has been described with reference to specific embodiments, this description is not meant to be constricted in a limiting sense. Various modifications of the disclosed embodiment, as well as other embodiments of the present invention, will become apparent to persons skilled in the art upon reference to the description of the present invention. It is therefore contemplated that the appended claims will cover any modifications or embodiments as fall within the true scope of the present invention.

What is claimed is:

1. In a global paging system for providing paging services for a plurality of paging receivers distributed in service areas of a plurality of base stations, a paging controller responsive to a paging call received from a subscriber of a Public Switched Telephone Network (PSTN) therethrough for producing a paging request signal containing a subscriber number of an owner of said paging receiver called, wherein each of said base stations are connected to said paging controller through one of a plurality of transmission lines having different transmission times, each of said base stations producing a plurality of radio frequency carriers having different frequencies and modulated synchronously with a digital paging signal corresponding to said paging request signal, respectively, said paging controller comprising:

a delay time storage for preliminarily storing a first time value equal to a maximum value of the different transmission times of said transmission lines and a second time value required for converting said paging request signals to said digital paging signals at each of said base stations;

a first GPS receiver responsive to signals received from a plurality of NAVSTAR GPS (global positioning system) satellites for producing a time reference signal;

a first time reference circuit responsive to said time reference signal font producing high precision time signals having predetermined relation in time to a universal standard time;

code producing means for producing codes indicative of a time after a time instance, which is obtained by adding a sum of the first time value and the second time value to a current time, to said paging request signal as transmission start time assigning codes, and codes to specify one of said plurality of radio frequency carriers as channel number codes; and a plurality of first transmitting means for transmitting said paging request signals, said transmission start time assigning codes, and said channel number codes to said base stations through a respective one of said plurality of transmission lines, each of said first transmitting means being connected to each of said base stations through a respective one of said transmission lines, a bit rate of said each transmission line being N times that of said plurality of radio frequency carriers; and said base stations each comprising:

a reception buffer memory means for receiving said paging request signals and storing them temporarily;

a second GPS receiver responsive to the signals from said GPS satellites for producing said time reference signal having a predetermined relation in time to the universal standard time;

a second time reference circuit responsive to said time reference signal for producing a high precision time signal having a predetermined relation in time to the universal standard time;

a coincidence circuit for detecting a coincidence between the transmission start time assigning code accumulated in said receiving buffer memory means and said high precision time signal from said second time reference circuit;

a format conversion circuit for converting a format of said paging request signal into said digital paging signal from a time at which a coincidence output of said coincidence circuit is produced; and a plurality of second transmitting means for producing said plurality of radio frequency carriers by said channel number codes, respectively.

2. The paging system claimed in claim 1, wherein said second time reference circuit includes a highly stable quartz oscillator, produces a clock impulse defining a time position of each bit of said digital paging signal in response to said time reference signal from said second GPS receiver and maintains the production of said clock pulse even after said time reference signal is stopped.

* * * * *